(12) United States Patent
Petrevski et al.

(10) Patent No.: US 10,439,181 B2
(45) Date of Patent: Oct. 8, 2019

(54) BATTERY PACK

(71) Applicant: Robert Bosch GmbH, Stuttgart (DE)

(72) Inventors: Aleksandar Petrevski, Schwieberdingen (DE); Andreas Selent, Leonberg (DE); Boris Gendlin, Filderstadt (DE); Jonas Schuetz, Stuttgart-Bad Cannstatt (DE); Sarmimala Hore, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 15/451,664

(22) Filed: Mar. 7, 2017

(65) Prior Publication Data

US 2017/0263903 A1   Sep. 14, 2017

(30) Foreign Application Priority Data

Mar. 9, 2016 (DE) .................. 10 2016 203 818

(51) Int. Cl.
*H01M 2/10* (2006.01)

(52) U.S. Cl.
CPC ...... *H01M 2/1077* (2013.01); *H01M 2220/20* (2013.01)

(58) Field of Classification Search
CPC .................................................. H01M 2/1077
See application file for complete search history.

(56) References Cited

U.S. PATENT DOCUMENTS

| 2006/0050468 | A1* | 3/2006 | Inoue | H01G 2/04 |
| | | | | 361/328 |
| 2014/0087217 | A1 | 3/2014 | Zink et al. | |

FOREIGN PATENT DOCUMENTS

| DE | 102009035494 | 2/2011 |
| DE | 102010013002 | 9/2011 |
| DE | 102012217451 | 4/2014 |
| DE | 102012219778 | 4/2014 |
| DE | 102013206503 | 10/2014 |
| DE | 102013112731 | 5/2015 |
| DE | 102013020862 | 6/2015 |

* cited by examiner

*Primary Examiner* — Ladan Mohaddes
(74) *Attorney, Agent, or Firm* — Michael Best & Friedrich LLP

(57) ABSTRACT

A battery pack (50) comprising at least one battery module (10) with a plurality of battery cells (2) which are held together by at least one holding element (31, 32). The at least one battery module (10) is arranged in a housing (70), wherein the at least one holding element (31, 32) is attached to the housing (70) by fixing elements (41, 42, 43, 44).

8 Claims, 9 Drawing Sheets

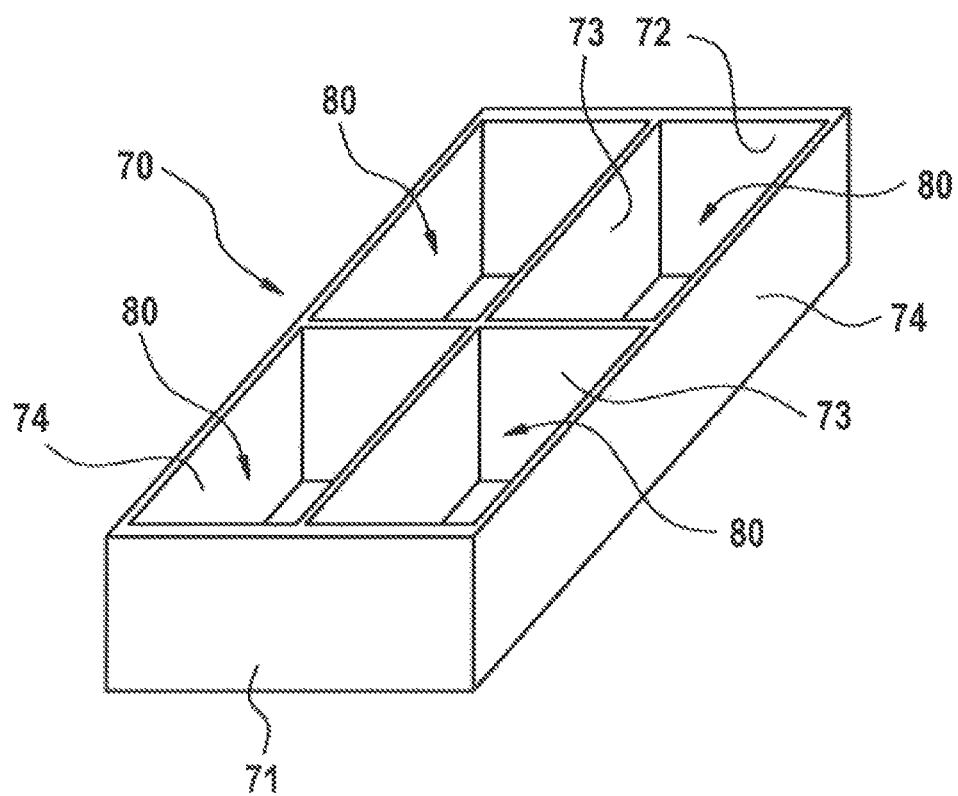

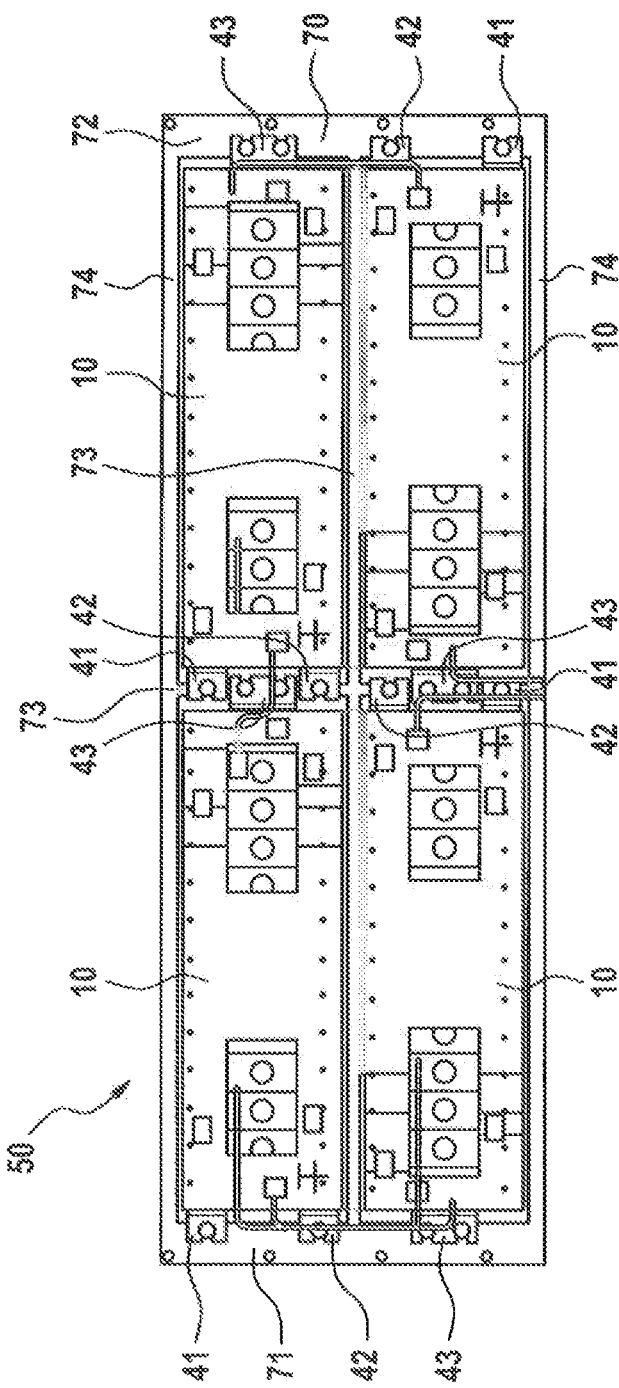

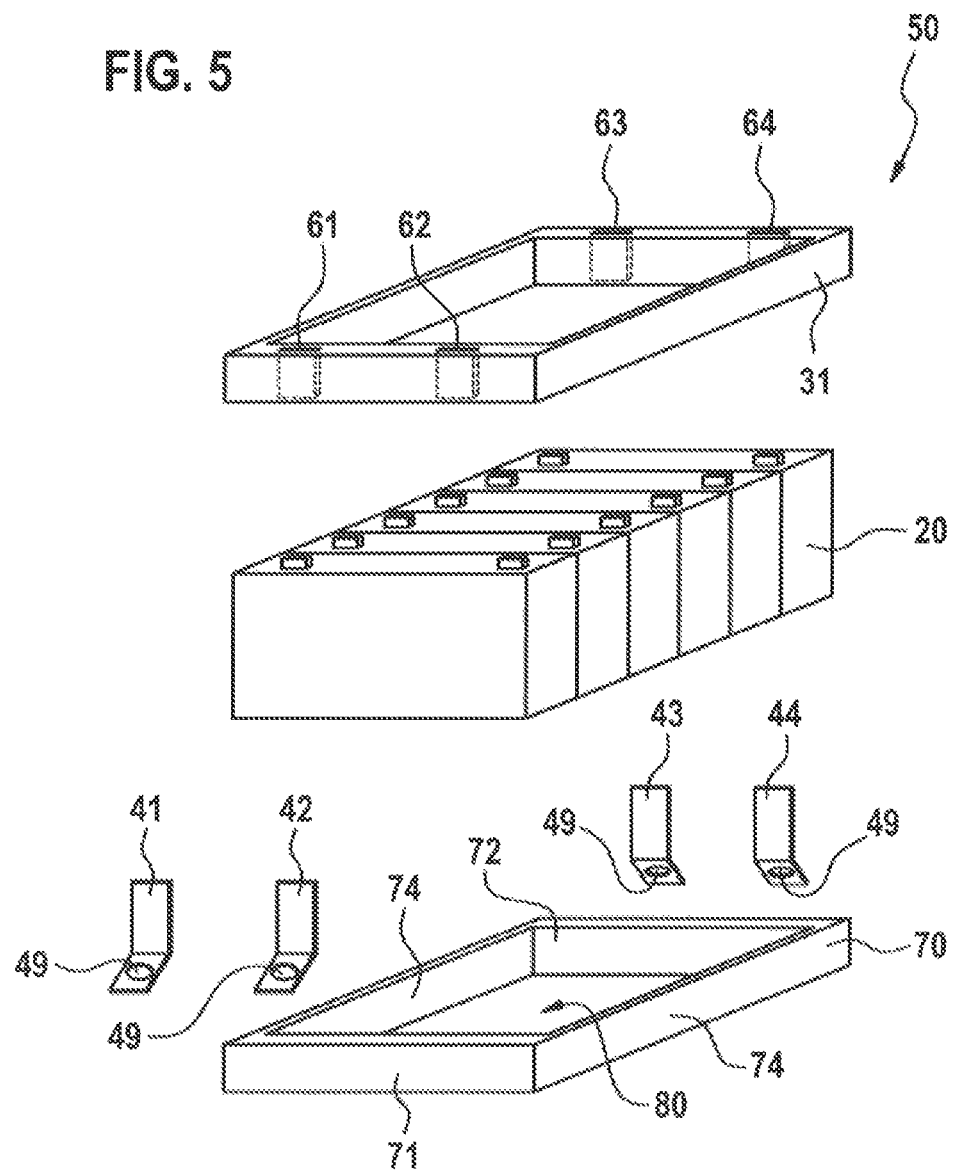

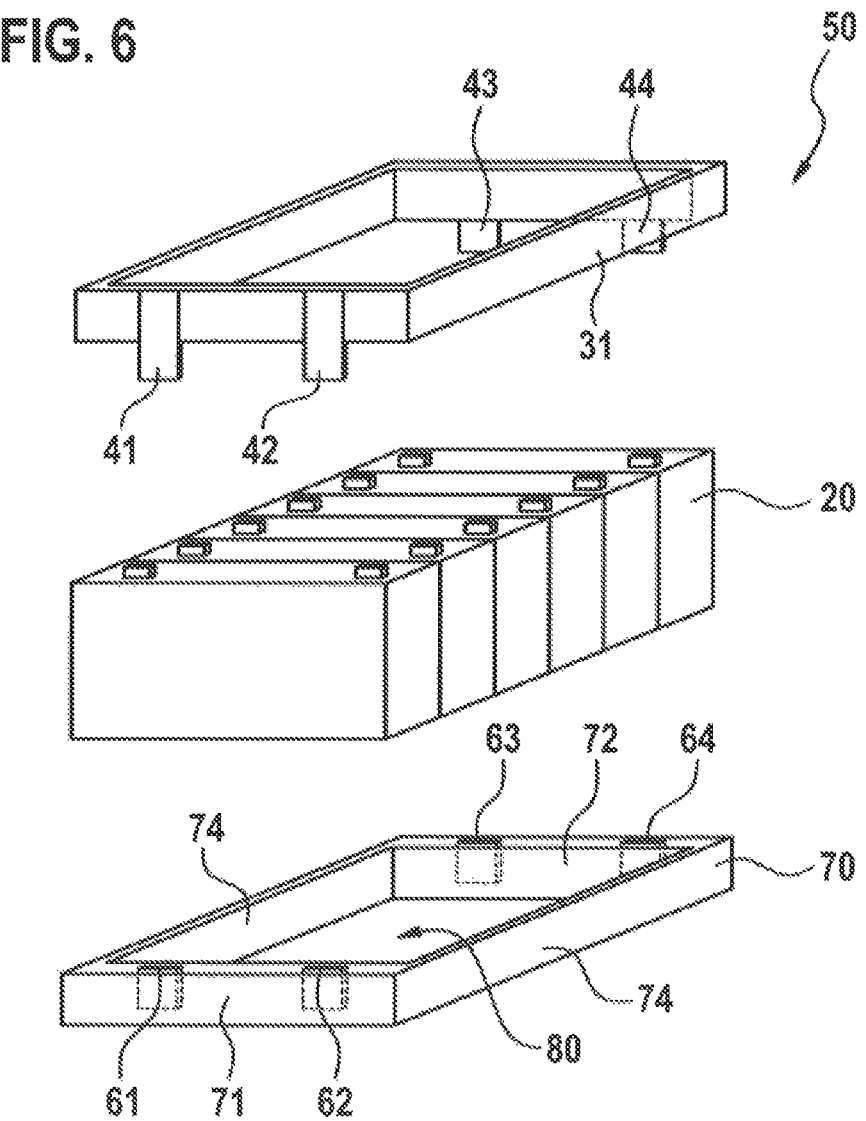

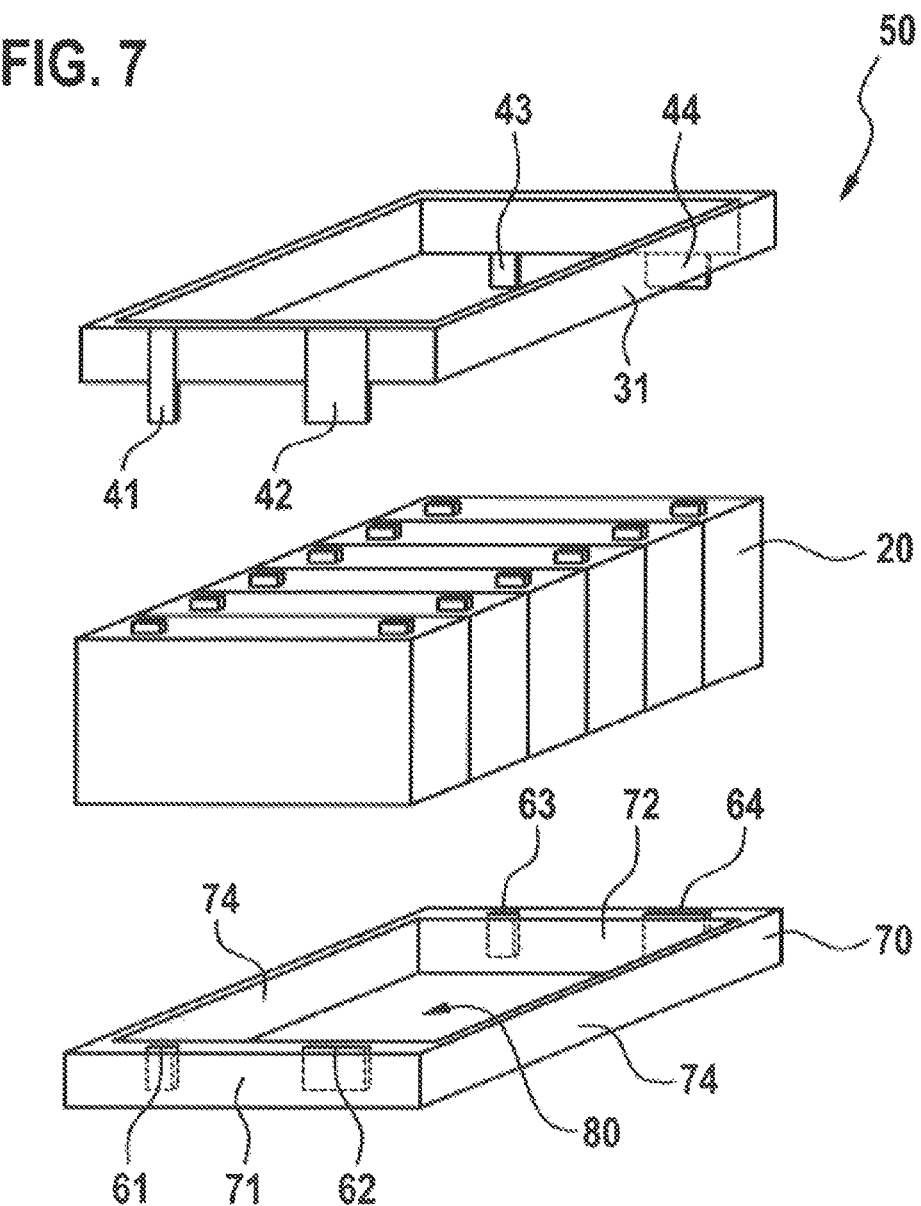

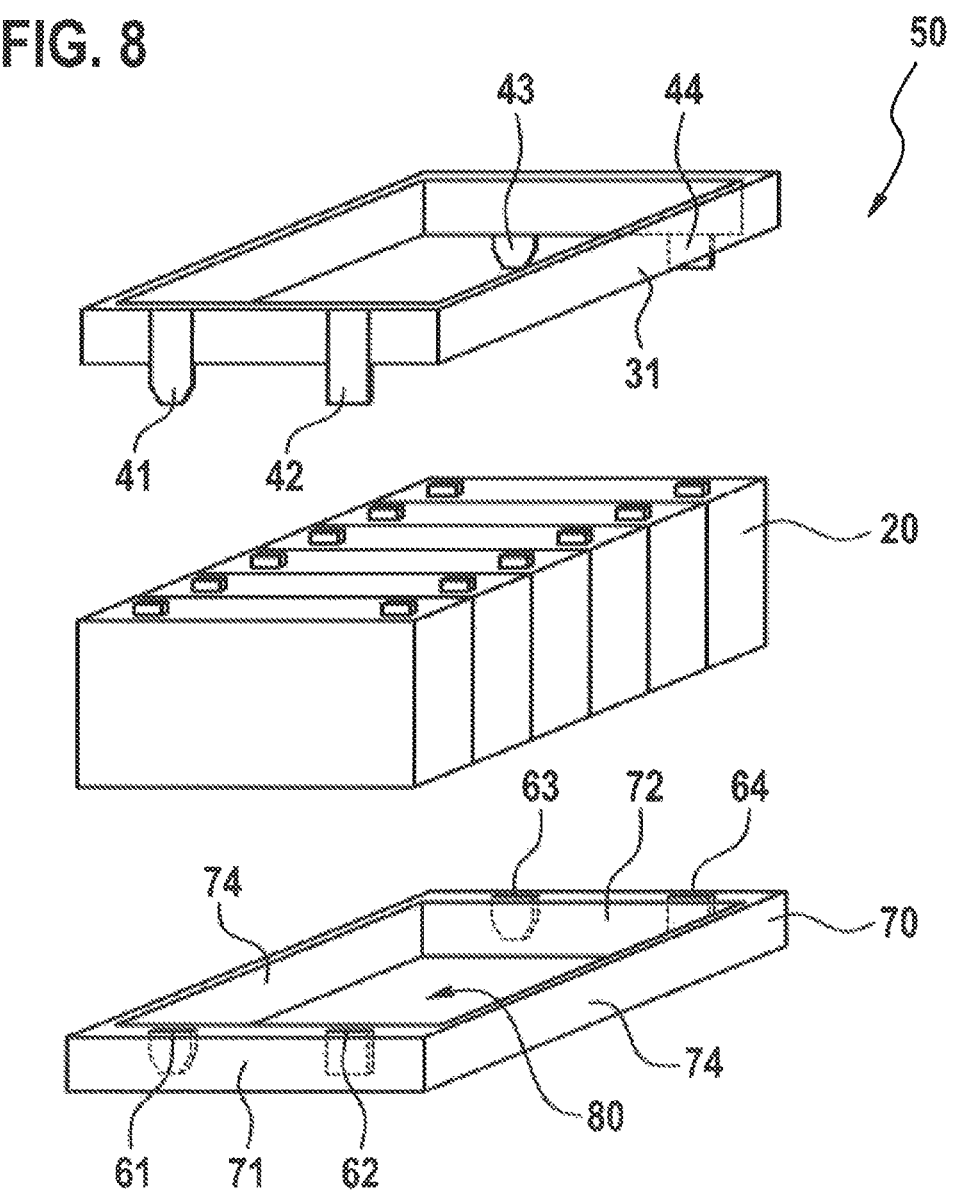

BATTERY PACK

BACKGROUND OF THE INVENTION

The invention concerns a battery pack which comprises at least one battery module with a plurality of battery cells, wherein said battery cells of the at least one battery module are held together by means of at least one holding element.

Electrical energy can be stored by means of batteries. Batteries convert chemical reaction energy into electrical energy. Here we distinguish between primary batteries and secondary batteries. Primary batteries are only able to function once, whereas secondary batteries—also known as accumulators—are rechargeable. A battery comprises one or more battery cells.

In particular, so-called lithium-ion battery cells are used in an accumulator and have an anode and a cathode. They are distinguished amongst others by high energy density, thermal stability and an extremely low self-discharge rate. Lithium-ion battery cells may be used amongst others in motor vehicles, in particular in electric vehicles (EV), hybrid electric vehicles (HEV) and plug-in hybrid electric vehicles (PHEV).

A generic battery cell is disclosed in DE 10 2012 217 451 A1. The battery cell has a cell housing which is made for example from a metal. The cell housing is prismatic in design, in particular cuboid, and is configured so as to be pressure-resistant. The battery cell has a positive terminal and a negative terminal for electrical contacting.

Several battery cells may be combined mechanically into a battery module. The battery cells are also connected together electrically. The terminals of the battery cells are connected together electrically by means of cell connectors.

Several battery modules may be combined into a battery pack and arranged in a common housing. The battery modules are also connected together electrically. Each terminal of the battery cell located at the edge of the battery module is electrically connected by means of a contact element to a terminal of a battery cell of another battery modul Document DE 10 2009 035 494 A1 discloses a battery which is provided in particular for use as a traction battery in a vehicle. The battery comprises several battery cells arranged next to each other in a block or stack and connected together electrically. The battery cells are held together by means of peripheral clamping straps. The clamping straps surround not only the battery cells but also a cover plate, a cooling plate and two pole plates.

Document DE 10 2013 112 731 A1 discloses a battery for a motor vehicle. Several battery cells are combined into a battery module, and several battery modules form a battery layer. Such a battery layer is placed in a housing tray. Because of the shape of the battery tray, the arrangement of the battery layer in the housing tray is necessarily pre-defined.

Document DE 10 2013 206 503 A1 discloses a battery module for a motor vehicle. The battery module comprises several battery cells arranged in a holding device. The holding device comprises fixing tabs by means of which a cooling plate can be attached to the holding device. The holding device furthermore comprises a cover on which fixing elements are arranged. By means of the fixing elements, the cover is attached by form fit to the housing of the holding device, and the battery cells are therefore fixed inside the holding device.

Document DE 10 2012 219 778 A1 discloses a battery module, in particular for use in a vehicle, which comprises several battery cells. The battery cells are arranged next to each other and connected together electrically. The battery module comprises a multipiece housing in which the battery cells are held. A conductor rail with a tab-like protruding portion is provided for electrical connection of the battery module.

SUMMARY OF THE INVENTION

A battery pack is proposed which comprises at least one battery module with a plurality of battery cells. The battery cells of the battery module are held together, and preferably also clamped, by means of at least one holding element.

According to the invention, the at least one battery module of the battery pack is arranged in a housing of the battery pack, wherein the at least one holding element of the battery module is attached to the housing of the battery pack by means of fixing elements. The at least one holding element of the battery module thus serves to hold the battery cells of the battery module together, and in some cases also to clamp the battery cells of the battery module. Furthermore, the at least one holding element of the battery module serves for attaching the battery module to the housing of the battery pack.

According to an advantageous embodiment of the invention, the fixing elements are arranged on the at least one holding element of the battery module and fixed to the housing of the battery pack by means of screws.

According to another advantageous embodiment of the invention, the fixing elements are arranged on the housing of the battery pack and fixed to the at least one holding element of the battery module by means of screws.

According to another advantageous embodiment of the invention, the fixing elements are arranged on the at least one holding element of the battery module and engage by form fit in associated openings in the housing of the battery module.

According to an advantageous embodiment of the invention, the fixing elements on the at least one holding element of the battery module and the associated openings in the housing of the battery pack have mutually complementary coding.

According to yet another advantageous embodiment of the invention, the fixing elements are arranged on the housing of the battery pack and engage by form fit in associated openings in the at least one holding element of the battery module.

According to an advantageous embodiment of the invention, the fixing elements on the housing of the battery pack and the associated openings in the at least one holding element of the battery module have mutually complementary coding.

Preferably, the at least one holding element of the battery module is configured as a strap surrounding the battery cells.

The housing of the battery pack may have a single receiving space for receiving precisely one battery module. Preferably, the housing of the battery pack however has a plurality of receiving spaces for receiving a plurality of battery modules. The individual receiving spaces of the housing of the battery pack are separated from each other by means of at least one partition wall. Fixing elements and/or openings may also be arranged in the partition wall.

According to a further advantageous embodiment of the invention, a plurality of battery modules is provided in the battery pack. Here, mutually complementarily formed fixing elements are assigned to adjacent battery modules of the battery pack.

A battery pack according to the invention is advantageously used in particular in an electric vehicle (EV), a hybrid electric vehicle (HEV), a plug-in hybrid electric vehicle (PHEV), a stationary battery or in a battery in a marine application. Other applications of the battery pack according to the invention are however also conceivable.

By the configuration of a battery pack according to the invention, its installation is advantageously simplified. The holding element serves to hold the battery cells of the battery module together, and to fix the battery module to the housing of the battery pack. In addition, the holding element may also serve to clamp the battery cells of the battery module. This multiple function of the holding element advantageously reduces the installation space and weight of the battery pack.

By the use of mutually complementary coding—also known as "poka yoke"—on the fixing means and the assigned openings in which the fixing means engage, furthermore incorrect installation of the battery pack is avoided. The complementary configuration of the fixing elements on adjacent battery modules may also avoid incorrect installation of the battery pack.

BRIEF DESCRIPTION OF THE DRAWINGS

FIG. 3 shows a diagrammatic, perspective depiction of a housing for a battery pack according to the first exemplary embodiment, FIG. 4 shows a top view of a battery pack according to the first exemplary embodiment, FIG. 5 shows a diagrammatic, exploded depiction of a battery pack according to a second exemplary embodiment, FIG. 6 shows a diagrammatic, exploded depiction of a battery pack according to a third exemplary embodiment, FIG. 7 shows a diagrammatic, exploded depiction of a battery pack according to a fourth exemplary embodiment, FIG. 8 shows a diagrammatic, exploded depiction of a battery pack according to a fifth exemplary embodiment.

DETAILED DESCRIPTION

Figure 1:
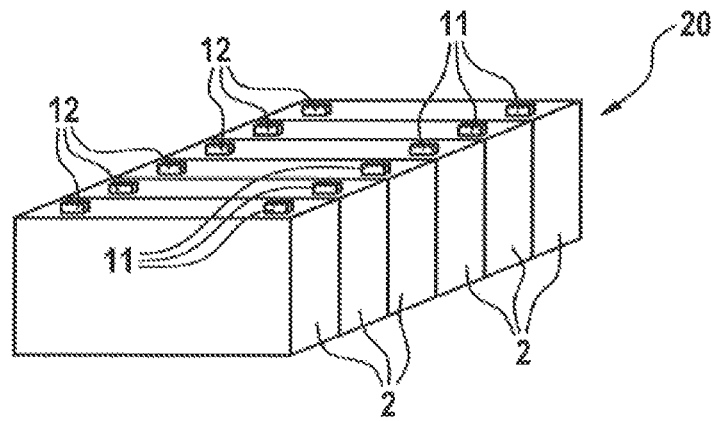
FIG. 1 shows a diagrammatic, perspective depiction of a battery block for a battery module.

In the description below of embodiments of the invention, the same or similar elements carry the same reference numerals, wherein the description of these elements is not repeated in each case. The figures depict the subject of the invention merely diagrammatically.

FIG. 1 shows a diagrammatic, perspective depiction of a battery block 20 for a battery module 10. The battery block 20 comprises a plurality of battery cells 2 arranged next to each other. Each of the battery cells 2 comprises a negative terminal 11 and a positive terminal 12. The battery cells 2 of the battery block 20 are electrically connected by means of connecting elements, not shown here.

Figure 2:
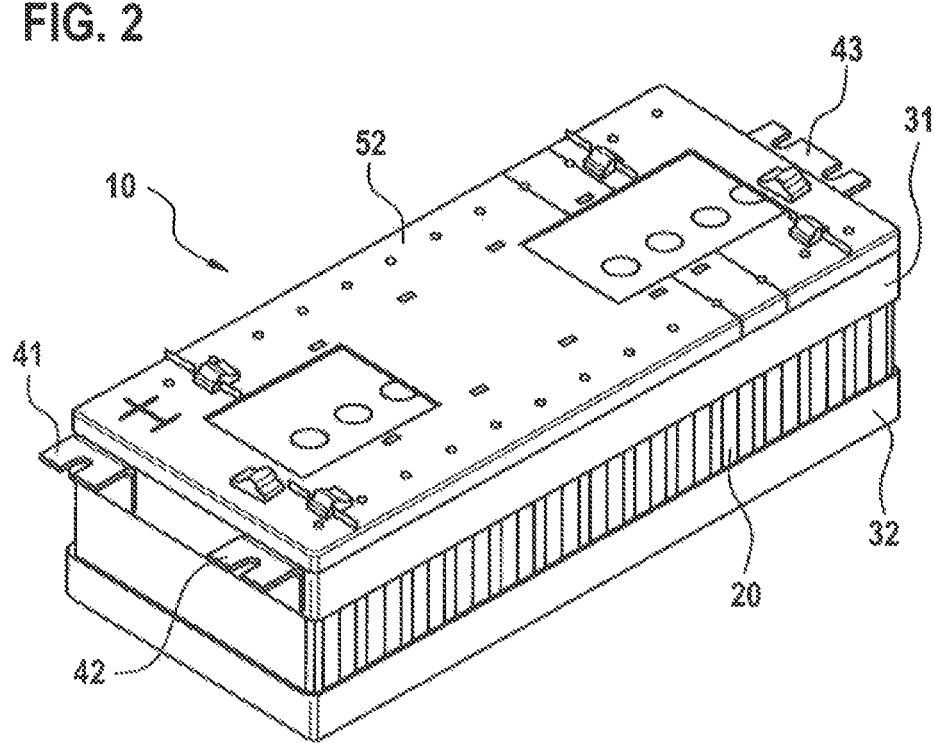
FIG. 2 shows a diagrammatic, perspective depiction of a battery module for a battery pack according to a first exemplary embodiment.

FIG. 2 shows a diagrammatic, perspective depiction of a battery module 10 for a battery pack 50 according to a first exemplary embodiment. The battery module 10 comprises a battery block 20 shown in FIG. 1, which is held together by a first holding element 31 and a second holding element 32. The holding elements 31, 32 are here configured as straps running around the battery cells 2 of the battery block 20. The terminals 11, 12 of the battery cells 2 are also covered with a cover 52.

A first fixing element 41, a second fixing element 42 and a third fixing element 43 are arranged on the first holding element 31. The first fixing element 41 and the second fixing element 42 are arranged on an end face of the battery module 10, and the third fixing element 43 is arranged on the opposite end face.

FIG. 3 shows a diagrammatic, perspective depiction of a housing 70 for a battery pack 50 according to the first exemplary embodiment. The housing 70 has two side walls 74 running parallel to each other and spaced apart from each other. The housing 70 also has a front wall 71 and a rear wall 72. The front wall 71 and the rear wall 72 also run parallel to each other and are spaced apart from each other. The side walls 74 run at right angles to the front wall 71 and to the rear wall 72.

A partition wall 73 is provided between the front wall 71 and the rear wall 72, and runs parallel to the front wall 71 and rear wall 72. A further partition wall 73 is provided between the side walls 74 and runs parallel to the side walls 74. In the interior of the housing 70, therefore, four receiving spaces 80 are formed, each of which serves to receive a battery module 10 and which are separated from each other by means of the partition wall 73.

FIG. 4 shows a top view of the battery pack 50 according to the first exemplary embodiment. A battery module 10 is placed in each receiving space 80 of the housing 70. The battery modules 10 located on the top in the view shown, form a first row of adjacent battery modules 10. The battery modules 10 located on the bottom in the view shown, form a second row of adjacent battery modules 10.

The battery modules 10 of the first row are oriented in the same way, wherein their first fixing elements 41 and second fixing elements 42 point to the left in the view shown, and wherein their third fixing elements 43 point to the right in the view shown. The battery modules 10 of the second row are also oriented in the same way, wherein their first fixing elements 41 and second fixing elements 42 point to the right in the view shown, and wherein their third fixing elements 43 point to the left in the view shown.

The fixing elements 41, 42, 43 have passage holes or slots. Screws (not shown here) are screwed through said passage holes or slots into the housing 70. Thus the fixing elements 41, 42, 43 are fixed to the housing 70 by means of screws.

The fixing elements 41, 42, 43 are arranged on the first holding element 31 of the battery module 10 such that the first fixing element 41 and the second fixing element 42 hold between them the third fixing element 43 of an adjacent battery module 10. Thus adjacent battery modules 10 of the battery pack 50 comprise mutually complementarily formed fixing elements 41, 42, 43. Therefore incorrect insertion of the battery modules 10 in the housing 70 is not possible.

FIG. 5 shows a diagrammatic, exploded view of a battery pack 50 according to a second exemplary embodiment. The battery pack 50 has a battery module 10 which comprises a battery block 20 (shown in FIG. 1) which is held together by a first holding element 31. The battery pack 50 furthermore has a housing 70 with a front wall 71, a rear wall 72 and two side walls 74. The housing 70 has a receiving space 80 for receiving the battery module 10.

The battery pack 50 comprises a first fixing element 41, a second fixing element 42, a third fixing element 43 and a fourth fixing element 44. The fixing elements 41, 42, 43, 44 are configured as angled elements, wherein a bore 49 is made in each leg. By means of screws (not shown here) which pass through the bores 49, the fixing elements 41, 42, 43, 44 are arranged on the front wall 71 and rear wall 72 of the housing 70. The other legs of the fixing elements 41, 42, 43, 44 protrude away from the housing 70.

A first opening 61, a second opening 62, a third opening 63 and a fourth opening 64 are made in the first holding element 31. The legs of the fixing elements 41, 42, 43, 44 protruding away from the housing 70 engage by form fit in the openings 61, 62, 63, 64 so that the first holding element 31 is attached to the housing 70.

FIG. 6 shows a diagrammatic, exploded depiction of a battery pack 50 according to a third exemplary embodiment. The battery pack 50 has a battery module 10 which comprises a battery block 20 (shown in FIG. 1) which is held together by a first holding element 31. The battery pack 50 furthermore has a housing 70 with a front wall 71, a rear wall 72 and two side walls 74. The housing 70 has a receiving space 80 for receiving the battery module 10.

The battery pack 50 comprises a first fixing element 41, a second fixing element 42, a third fixing element 43 and a fourth fixing element 44. The fixing elements 41, 42, 43, 44 are configured as tab-like elements which are arranged on the first holding element 31. The fixing elements 41, 42, 43, 44 protrude away from the first holding element 31.

A first opening 61, a second opening 62, a third opening 63 and a fourth opening 64 are made in the housing 70. The fixing elements 41, 42, 43, 44 protruding away from the first holding element 31 engage by form fit in the openings 61, 62, 63, 64 so that the first holding element 31 is attached to the housing 70.

FIG. 7 shows a diagrammatic, exploded depiction of a battery pack 50 according to a fourth exemplary embodiment. The battery pack 50 has a battery module 10 which comprises a battery block 20 (shown in FIG. 1) which is held together by a first holding element 31. The battery pack 50 furthermore has a housing 70 with a front wall 71, a rear wall 72 and two side walls 74. The housing 70 has a receiving space 80 for receiving the battery module 10.

The battery pack 50 according to the fourth exemplary embodiment largely resembles the battery pack 50 shown in FIG. 6 according to the third exemplary embodiment. By deviation therefrom, the fixing elements 41, 42, 43, 44 and the openings 61, 62, 63, 64 have mutually complementary coding. Therefore, the description below focuses primarily on the differences caused by the coding.

The first fixing element 41 and the second fixing element 42 are formed more narrowly than the third fixing element 43 and the fourth fixing element 44. Also, the associated first opening 61 and second opening 62 are formed more narrowly than the third opening 63 and the fourth opening 64. The third fixing element 43 and the fourth fixing element 44 will not therefore fit into the narrow first opening 61 and second opening 62. Thus incorrect insertion of the battery module 10 in the housing 70 is not possible.

FIG. 8 shows a diagrammatic, exploded depiction of a battery pack 50 according to a fifth exemplary embodiment. The battery pack 50 has a battery module 10 which comprises a battery block 20 (shown in FIG. 1) which is held together by a first holding element 31. The battery pack 50 furthermore has a housing 70 with a front wall 71, a rear wall 72 and two side walls 74. The housing 70 has a receiving space 80 for receiving the battery module 10.

The battery pack 50 according to the fifth exemplary embodiment largely resembles the battery pack 50 shown in FIG. 6 according to the third exemplary embodiment. By deviation therefrom, the fixing elements 41, 42, 43, 44 and the openings 61, 62, 63, 64 have mutually complementary coding. Therefore, the description below focuses primarily on the differences caused by the coding.

The first fixing element 41 and the second fixing element 42 have conically tapering ends, while the third fixing element 43 and the fourth fixing element 44 are formed rectangular. Also, the associated first opening 61 and second opening 62 are formed conical. The third fixing element 43 and the fourth fixing element 44 will not therefore fit into the conical first opening 61 and second opening 62. Therefore incorrect insertion of the battery module 10 in the housing 70 is not possible.

Figure 9A:
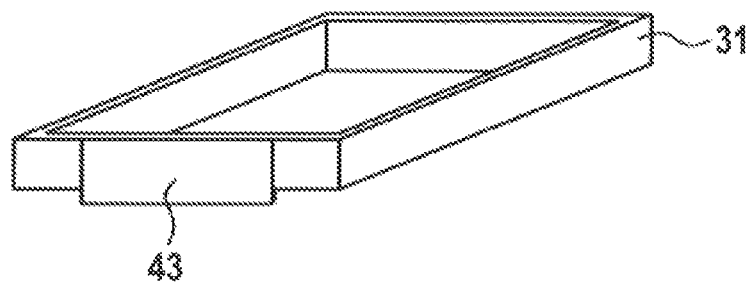
FIG. 9a, 9b, 9c show diagrammatic, perspective depictions of alternative embodiments of holding elements.
Figure 9B:
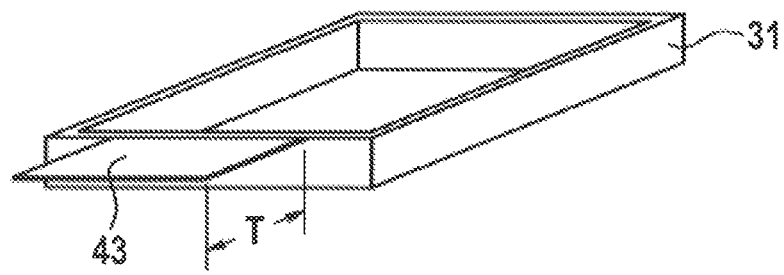
Figure 9C:
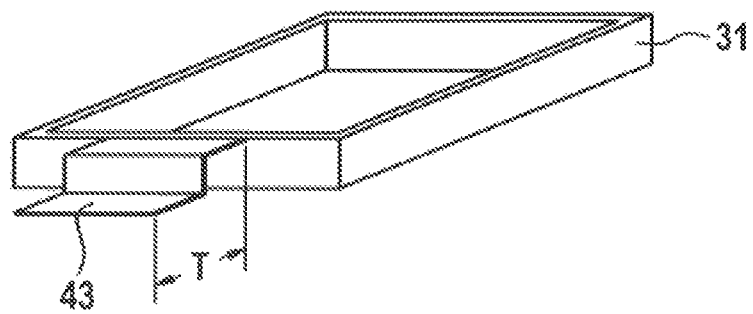

FIGS. 9a, 9b, 9c show diagrammatic, perspective depictions of alternative embodiments of first holding elements 31.

The first holding element 31 shown in FIG. 9a here comprises a third fixing element 43 which is formed more widely than the first fixing element 41 and the second fixing element 42, which are arranged on the opposite side but not shown here. Accordingly, the corresponding housing 70 has a third opening 63 belonging to the third fixing element 43, which is formed more widely than the first opening 61 and the second opening 62.

The first holding element 31 shown in FIG. 9b here comprises a third fixing element 43 which protrudes at right angles from the first holding element 31. Accordingly, the corresponding housing 70 has a third opening 63 belonging to the third fixing element 43, which is made laterally in the front wall 71, the rear wall 72 or a partition wall 73. The third fixing element 43 has a depth T which is smaller than a thickness D of the wall 71, 72, 73 in which the third opening 63 is made. Furthermore, the third fixing element 43 is formed more widely than the first fixing element 41 and the second fixing element 42, which are arranged on the opposite side but not shown here.

The first holding element 31 shown in FIG. 9c here comprises a third fixing element 43 which initially protrudes at right angles from the first holding element 31. In its further course, the third fixing element 43 has a step. Accordingly, the corresponding housing 70 has a third opening 63 belonging to the third fixing element 43, which is made laterally in the front wall 71, the rear wall 72 or a partition wall 73. The third fixing element 43 has a depth T which is smaller than a thickness D of the wall 71, 72, 73 in which the third opening 63 is made. Furthermore, the third fixing element 43 is formed more widely than the first fixing element 41 and the second fixing element 42, which are arranged on the opposite side but not shown here.

Figure 10:
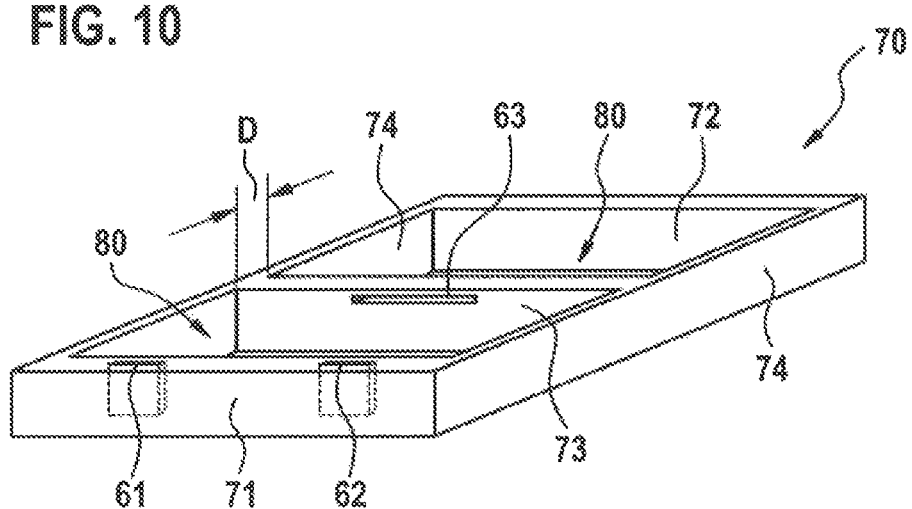
FIG. 10 shows a diagrammatic, perspective depiction of an alternative housing design.

FIG. 10 shows a diagrammatic, perspective depiction of an alternative design of the housing 70. The housing 70 has two parallel side walls 74, a front wall 71 and a rear wall 72. The side walls 74 run at right angles to the front wall 71 and the rear wall 72. A partition wall 73 is provided between the front wall 71 and the rear wall 72 which runs parallel to the front wall 71 and rear wall 72. Thus in the interior of the housing 70, two receiving spaces 80 are formed which each serve to receive a battery module 10 and which are separated from each other by means of the partition wall 73.

A first opening 61 and a second opening 62 are made in the front wall 71 for receiving a first fixing element 41 and a second fixing element 42. A third opening 63 is made in the partition wall 73 for receiving a third fixing element 43. The third opening 63 is made laterally in the third partition wall 73 and serves for example to receive a third fixing element 43, shown in FIG. 9b or 9c. The partition wall 73 has a thickness D which is greater than the depth T of the third fixing element 43 inserted in the third opening 63.

The invention is not restricted to the exemplary embodiments described herein and the aspects emphasized herein. Rather, a plurality of derivations, which lie within the range of action of the person skilled in the art, are possible inside the scope given by the claims.

The invention claimed is:

1. A battery pack (50) comprising at least one battery module (10) with a plurality of battery cells (2) which are held together by means of at least one holding element (31, 32) to form a grouped plurality of battery cells, characterized in that the at least one battery module (10) is arranged in a housing (70), wherein the at least one holding element (31, 32) is a strap that surrounds only an outer perimeter of the grouped plurality of battery cells (2) and is attached to the housing (70) by means of fixing elements (41, 42, 43, 44), wherein the fixing elements (41, 42, 43, 44) have mutually complementary coding with associated openings (61, 62, 63, 64) in one of the housing (70) or the at least one holding element (31, 32) to prevent incorrect insertion of the battery module (10) in the housing (70).

2. The battery pack (50) according to claim 1, characterized in that the fixing elements (41, 42, 43, 44) are arranged on the at least one holding element (31, 32) and fixed to the housing (70) by means of screws.

3. The battery pack (50) according to claim 1, characterized in that the fixing elements (41, 42, 43, 44) are arranged on the housing (70) and fixed to the at least one holding element (31, 32) by means of screws.

4. The battery pack (50) according to claim 1, characterized in that the fixing elements (41, 42, 43, 44) are arranged on the at least one holding element (31, 32) and engage by form fit in the associated openings (61, 62, 63, 64) in the housing (70).

5. The battery pack (50) according to claim 1, characterized in that the fixing elements (41, 42, 43, 44) are arranged on the housing (70) and engage by form fit in the associated openings (61, 62, 63, 64) in the at least one holding element (31, 32).

6. The battery pack (50) according to claim 1, characterized in that the housing (70) has a plurality of receiving spaces (80) for receiving battery modules (10), which are separated from each other by means of at least one partition wall (73).

7. The battery pack (50) according to claim 6, characterized in that a plurality of battery modules (10) is provided, wherein mutually complementarily formed fixing elements (41, 42, 43, 44) are assigned to adjacent battery modules (10).

8. A vehicle comprising a battery pack (50) including at least one battery module (10) with a plurality of battery cells (2) which are held together by means of at least one holding element (31, 32) to form a grouped plurality of battery cells, characterized in that the at least one battery module (10) is arranged in a housing (70), wherein the at least one holding element (31, 32) is a strap that surrounds only an outer perimeter of the grouped plurality of battery cells (2) and is attached to the housing (70) by means of fixing elements (41, 42, 43, 44), wherein the fixing elements (41, 42, 43, 44) have mutually complementary coding with associated openings (61, 62, 63, 64) in one of the housing (70) or the at least one holding element (31, 32) to prevent incorrect insertion of the battery module (10) in the housing (70).

* * * * *